United States Patent
Mori et al.

(10) Patent No.: US 9,104,194 B2
(45) Date of Patent: Aug. 11, 2015

(54) PROCESSING INFORMATION ACQUISITION SYSTEM IN PROCESSING MACHINE SUPPLYING PROCESSING POINT WITH ENERGY OR MATERIAL

(75) Inventors: Atsushi Mori, Minamitsuru-gun (JP); Akinori Ohyama, Minamitsuru-gun (JP); Junichi Tezuka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 790 days.

(21) Appl. No.: 13/198,027

(22) Filed: Aug. 4, 2011

(65) Prior Publication Data

US 2012/0035745 A1     Feb. 9, 2012

(30) Foreign Application Priority Data

Aug. 6, 2010   (JP) .................................. 2010-177630

(51) Int. Cl.
*G05B 19/416*     (2006.01)

(52) U.S. Cl.
CPC .. *G05B 19/4163* (2013.01); *G05B 2219/31376* (2013.01); *G05B 2219/45165* (2013.01); *G05B 2219/50074* (2013.01)

(58) Field of Classification Search
CPC .. B23K 26/426; H01S 3/073; G05B 19/4163; G05B 2219/45165; G05B 2219/50074
USPC ............... 700/12, 13, 61, 134, 166, 174, 186, 700/195, 212; 219/121.6, 121.61, 121.62, 219/121.78, 121.79, 124.31, 124.4
See application file for complete search history.

(56) References Cited

U.S. PATENT DOCUMENTS 5,575,935 A * 11/1996 Nakata ..................... 219/121.61
5,814,375 A *  9/1998 Hissen ......................... 427/424

(Continued)

FOREIGN PATENT DOCUMENTS

JP   03-035891   2/1991
JP   7-5908      1/1995

(Continued)

OTHER PUBLICATIONS

Japanese Office Action dated Dec. 9, 2014 that issued in related Japanese Patent Application No. 2014-016637 (along with its partial English-language translation).

*Primary Examiner* — Darrin Dunn
(74) *Attorney, Agent, or Firm* — Drinker Biddle & Reath LLP

(57) ABSTRACT

A processing information acquisition system in a processing machine which feeds a processing point energy or material, the processing information acquisition system provided with a position information acquisition unit which acquires position information of a feed unit of energy or material, a feed rate control unit which receives a feed condition command of energy or material, converts the feed condition command to a control command which controls a feed of energy or material, and uses the converted control command to control a feed rate of energy or material from the feed unit, a feed rate estimation unit which acquires the control command from the feed rate control unit and calculates an estimated feed rate of energy or material which is fed to a processing point based on the control command, and an output unit which outputs the position information which the position information acquisition unit acquired and the estimated feed rate which the feed rate estimation unit calculated when the feed unit is located at a position corresponding to the position information.

4 Claims, 9 Drawing Sheets

(56) References Cited

U.S. PATENT DOCUMENTS

| | | | |
|---|---|---|---|
| 5,841,096 A * | 11/1998 | Takahashi et al. | 219/121.62 |
| 5,893,987 A * | 4/1999 | Yamazaki et al. | 219/121.61 |
| 5,961,857 A * | 10/1999 | Takahashi et al. | 219/121.62 |
| 6,350,326 B1 * | 2/2002 | McCay et al. | 148/503 |
| 7,526,357 B2 * | 4/2009 | Livingston et al. | 700/166 |
| 2003/0234240 A1 * | 12/2003 | Yamazaki et al. | 219/121.62 |
| 2004/0112876 A1 * | 6/2004 | Watanabe | 219/121.67 |
| 2004/0129688 A1 * | 7/2004 | Mori | 219/121.61 |
| 2005/0195867 A1 * | 9/2005 | Egawa et al. | 372/33 |
| 2006/0131289 A1 * | 6/2006 | Jyumonji et al. | 219/121.83 |
| 2006/0178770 A1 * | 8/2006 | Egawa et al. | 700/166 |
| 2007/0047610 A1 * | 3/2007 | Egawa et al. | 372/55 |
| 2007/0177128 A1 * | 8/2007 | Ando et al. | 356/28 |
| 2009/0084989 A1 * | 4/2009 | Imai | 250/492.22 |
| 2011/0046766 A1 * | 2/2011 | Mienhardt et al. | 700/103 |
| 2012/0035745 A1 * | 2/2012 | Mori et al. | 700/13 |

FOREIGN PATENT DOCUMENTS

| | | |
|---|---|---|
| JP | 7-204942 | 8/1995 |
| JP | 7-294558 | 11/1995 |
| JP | 2001-75622 | 3/2001 |
| JP | 2006-218535 A | 8/2006 |
| JP | 2007-014861 | 1/2007 |
| JP | 2007-296580 A | 11/2007 |
| JP | 2007-319927 A | 12/2007 |
| JP | 2010-47789 | 3/2010 |

* cited by examiner

FIG.6

NC PROGRAM

```
. . . . .
G01 X5. Y10. S500 P1000 Q100 F20000 ;  ①
G01 X5. Y10. S1000 P2000 Q75 F20000 ;  ②
. . . . .
```

A. DECIPHER AND GENERATE COMMANDS

PROCESSING SEQUENCE

| Pc500W, Fr1000Hz, Duty100% | X1.073, Y2.147, Tc0/16 | /16ms |
| Pc500W, Fr1000Hz, Duty100% | X1.073, Y2.147, Tc0/16 | /16ms |
| Pc500W, Fr1000Hz, Duty100% | X1.073, Y2.147, Tc0/16 | /16ms |
| Pc500W, Fr1000Hz, Duty100% | X1.073, Y2.147, Tc0/16 | /16ms |
| Pc1000W, Fr2000Hz, Duty75% | X1.073, Y2.147, Tc10/16 | /16ms |
| Pc1000W, Fr2000Hz, Duty75% | X1.073, Y2.147, Tc0/16 | /16ms |
| Pc1000W, Fr2000Hz, Duty75% | X1.073, Y2.147, Tc0/16 | /16ms |

B. SORT AND TRANSMIT

/16 ms SYNCHRONOUS INTERFACE

| Ic 7V, Ton 0.37ms, Toff 0.12ms, Tc 10/16 | X1.073 | Y2.147 |

↓ C. CONVERT TO 1 ms INTERVAL DATA

| Ic 7V, Ton 0.37ms, Toff 0.12ms | X0.067 | Y0.134 | /1ms |

→ SERVO POWER SUPPLY
→ LASER POWER SUPPLY

PULSE CODER / POWER MONITOR

E. FEED RATE ESTIMATION 1        D. FEEDBACK SIGNAL

| Pc1000W, Fr2041Hz, Duty75.5% | X0.067 | Y0.134 | Pa500W | /1ms×16 |

F. FEED RATE ESTIMATION 2

| Pc1000W, Fr2041Hz, Duty75.5%, Pas805W | X0.067 | Y0.134 | Pa500W | /1ms×16 |
| DELAY | DELAY | DELAY | | COLLECT PROCESSING INFORMATION |

DISPLAY PROCESSING INFORMATION

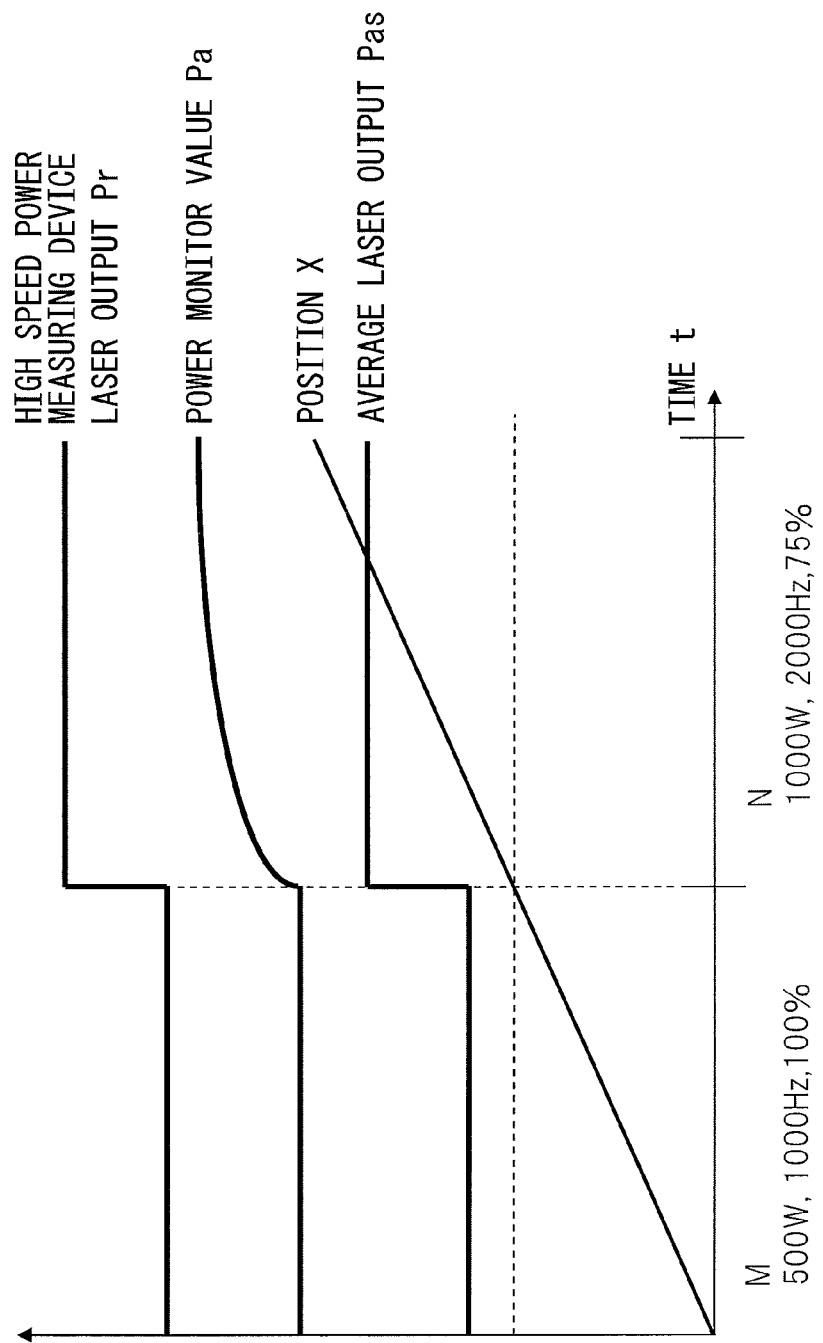

PROCESSING INFORMATION ACQUISITION SYSTEM IN PROCESSING MACHINE SUPPLYING PROCESSING POINT WITH ENERGY OR MATERIAL

RELATED APPLICATION DATA

This application claims priority under 35 U.S.C. §119 and/or §365 to Japanese Application No. 2010-177630 filed Aug. 6, 2010, the entire contents of which is incorporated herein by reference.

BACKGROUND OF THE INVENTION

1. Field of the Invention

The present invention relates to a processing information acquisition system in a processing machine which supplies a processing point with energy or material.

2. Description of the Related Art

In a laser cutting machine, a laser welding machine, a laser heat treatment machine, a plasma cutting machine, an arc welding machine, a wirecut machine, a sealant coating machine, an automatic painting machine, and various other types of processing machines, processing is performed by firing a laser beam, generating an arc, or applying a sealant, that is, supplying a processing point with energy or material, while moving the processing point over the workpiece. Further, at the time of processing, along with this, sometimes a shield gas or welding wire is supplied.

In such a processing machine, the position of the processing point is feedback controlled by a servo control system based on position information obtained from a pulse coder, linear scale, etc. of a servo motor performing positioning.

Further, regarding the supply of the laser beam, sealant, or other energy or material, the optimal feed rate and other processing conditions change depending on the processing speed and the shape to be processed, so the command values of the processing conditions which are transmitted to the control device also have to be changed accordingly. For example, in firing a laser beam, feeding welding wire, and applying a sealant, the amount of power of the laser excitation power supply, the feed rate at the wire reel part, the sealant feed valve opening degree, or other processing conditions are changed.

Regarding this, after the command values of the processing conditions are transmitted to the control device, the actual processing state at the processing point does not immediately change to the desired processing conditions. For example, in a laser processing machine, a certain time is required from when current is supplied to the laser generator to when the laser beam is fired. In this way, there is some delay in the response. Furthermore, the average laser output value of the actually fired laser beam is not proportional to the command value. Further, in another example, when feeding a gas or liquid to a processing point, the command value relating to the valve opening degree and the amount which is actually fed to the processing point are also not strictly proportional.

In these various types of processing machines, outputting processing information relating to the actual processing state at a processing point, including position information of the processing point, in real time simultaneously to a liquid crystal panel or other display device or to a hard disk drive or other storage device would be extremely effective in monitoring, development, troubleshooting, etc. However, for generation of laser beams or arcs and feed of sealant, instead of feedback control, open loop control is sometimes used. Therefore, acquiring processing information and outputting that processing information in real time is difficult.

Japanese Patent Publication (A) No. 2001-75622 (JP2001-75622A) discloses a servo system which is provided with a servo control device including a drive unit which drives a controlled object and with a plurality of servo compensation units and which is provided with a display device which displays control conditions of a controlled object. The servo system of 2001-75622A enables simultaneous confirmation of the effect of servo compensation processing and the legitimacy of an operation and enables quick and easy determination of the servo compensation parameters of the positioning control. Further, Japanese Patent Publication (A) No. 7-204942 (JP7-204942A) discloses a monitoring system of an electrodischarge machine which can monitor the state of change of a monitored value showing the processing state of the electrodischarge machine. Further, Japanese Patent Publication (A) No. 7-5908 (7-5908A) discloses a measuring and monitoring system which acquires signals to be measured from the system being measured, samples them at fixed time intervals, and measures and monitors them by arithmetic processing and thereby measures and monitors the position, speed, and other analog and digital signals of machine operation. Further, Japanese Patent Publication (A) No. 7-294558 (JP7-294558A) discloses a method of correction of data timing of a waveform recording and display system which automatically corrects time deviations due to differences in signal transmission paths of analog input waveforms and logic input waveforms in accordance with the sampling speed.

However, the devices described in JP2001-75622A, JP7-204942A, JP7-5908A, and JP7-294558A are ones which output a measured value to a display device or storage device. They are not ones which can estimate processing information relating to the actual processing state at a processing point and output it in real time to a display device or storage device. To output processing information relating to the actual processing state at a processing point in real time, some sort of estimation has to be performed to calculate the values.

SUMMARY OF INVENTION

The present invention provides, in one aspect, a processing information acquisition system in a processing machine which supplies a processing point with energy or material, which system estimates and outputs processing information relating to an actual processing state at a processing point, including position information of the processing point.

The present invention, as one aspect, provides a processing information acquisition system in a processing machine which supplies a processing point with energy or material, which system is provided with a position information acquisition unit which acquires position information of a feed unit of energy or material, a feed rate control unit which receives a feed condition command of energy or material, converts the feed condition command to a control command which controls a feed of energy or material, and uses the converted control command to control a feed rate of energy or material from the feed unit, a feed rate estimation unit which acquires the control command from the feed rate control unit and calculates an estimated feed rate of energy or material which is fed to a processing point based on the control command, and an output unit which outputs the position information which the position information acquisition unit acquired and the estimated feed rate which the feed rate estimation unit calculated when the feed unit is located at a position corresponding to the position information.

BRIEF DESCRIPTION OF DRAWINGS

The objects, features, and advantages of the present invention will become clearer from the following explanation of the embodiments with reference to the attached drawings, in which FIG. 6 is a view showing processing performed at the time of laser processing along the path shown in FIG. 5 using specific numerical values, FIG. 7 is a view showing an example of display of processing information obtained by processing along the path shown in FIG. 5.

DESCRIPTION OF THE PREFERRED EMBODIMENTS

Figure 1:
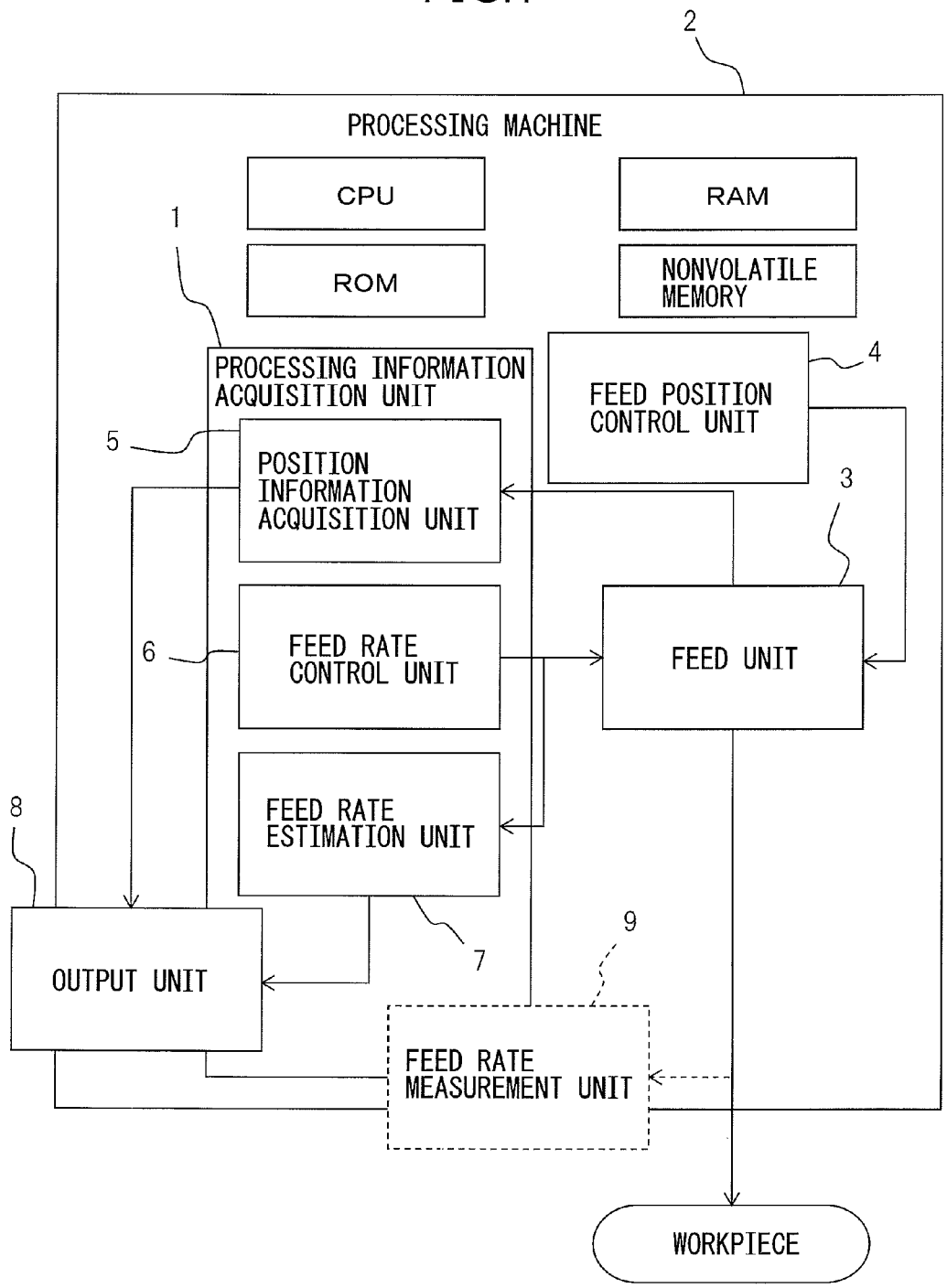
FIG. 1 is a block diagram showing an outline of a processing information acquisition system according to one aspect of the present invention.

Below, embodiments of the present invention will be explained in detail while referring to the drawings.

FIG. 1 is a block diagram showing an outline of a processing information acquisition system 1 according to one aspect of the present invention. The processing information acquisition system 1 according to one aspect of the present invention is included in a part of a processing machine 2 which supplies a processing point with energy or material.

The processing machine 2 is, for example, provided with parts which are connected with each other by a bidirectional bus such as a CPU (central processing unit), a ROM (read only memory) and a RAM (random access memory). Further, the processing machine 2 may be further provided with a nonvolatile memory. Furthermore, the processing machine 2 has a feed unit 3 which feeds a processing point with energy or material, for example, on a workpiece and a feed position control unit 4 for controlling the relative position of the feed unit 3 with respect to the processing point.

The processing information acquisition system 1 according to one aspect of the present invention has a position information acquisition unit 5 which acquires position information of the feed unit 3 which is controlled by the feed position control unit 4 and a feed rate control unit 6 which receives a processing condition command relating to feed, which is directly input from the outside using a keyboard, mouse, etc. or is generated by a program etc. such as the amount of power of a laser excitation power supply, feed rate at a wire reel part, or opening degree of a sealant feed valve, converts this feed condition command to a control command which controls a feed of energy or material, and uses the converted control command to control a feed rate of energy or material from the feed unit. Furthermore, the processing information acquisition system 1 according to one aspect of the present invention has a feed rate estimation unit 7 which acquires a control command from the feed rate control unit 6 and uses this control command as the basis to calculate an estimated feed rate of energy or material which is estimated to be actually fed to a processing point, and an output unit 8 which outputs position information which the position information acquisition unit acquired and the estimated feed rate which the feed rate estimation unit calculated when the feed unit is located at a position corresponding to this position information to a display unit which visually displays this to an operator, a hard disk drive or other storage unit which stores the estimated feed rate, or an output device to a printer or other medium.

Further, the processing information acquisition system 1 according to one aspect of the present invention may further have a feed rate measurement unit 9 which finds in advance a relationship between a control command and an estimated feed rate of energy or material, for example, a calculation formula, parameter, or map. For the feed rate measurement unit 9 to find the relationship between a control command and an estimated feed rate of energy or material, experiments are run while changing the processing point from a workpiece to the feed rate measurement unit 9 and changing the processing conditions. By using the feed rate measurement unit 9 to find the relationship between a control command and an estimated feed rate of energy or material in advance, the feed rate estimation unit 7 can use the acquired control command and previously found relationship to precisely calculate the estimated feed rate. Note that, the calculation formula, parameter, or map is stored in a ROM or other storage device.

The energy or material which is fed from the feed unit 3 is, for example, one or more types of energy or material selected from a light wave, current, plasma stream, gas, liquid, solid, powder, and atomized fluid. Specifically, a processing machine 2 including a processing information acquisition system 1 according to one aspect of the present invention may be a laser cutting machine, a laser welding machine, a laser heat treatment machine, a plasma cutting machine, an arc welding machine, a wirecut machine, a sealant coating machine, an automatic painting machine, etc. Therefore, when the processing machine 2 is a laser processing machine, the fed energy or material is a laser beam or assist gas, when the processing machine 2 is a plasma, processing machine, the fed energy or material is an arc current or plasma generating current or gas or welding filler, and when the processing machine 2 is a solvent coating processing machine, the fed energy or material is a paint, adhesive, or sealant.

Figure 2:
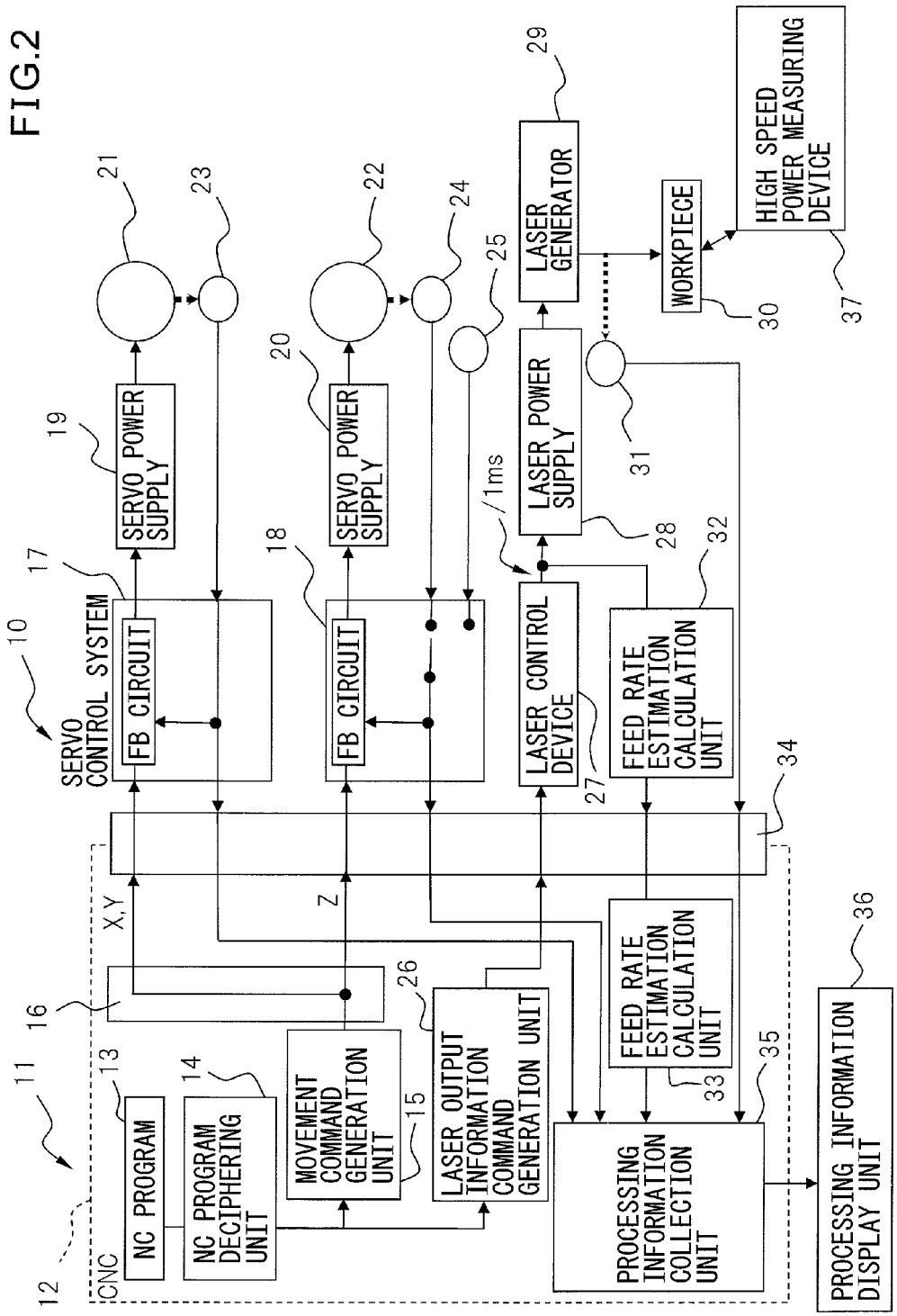
FIG. 2 is a view showing the specific configuration of a laser processing machine including a processing information acquisition system according to one aspect of the present invention.

Next, while referring to FIG. 2, using the case where the processing machine 2 is a laser processing machine 10 as an example, the specific configuration of a laser processing machine 10 including a processing information acquisition system 11 according to one aspect of the present invention will be explained. The laser processing machine 10 has a numerical control device 12 (CNC). The numerical control device 12 includes an input device which receives as input the laser output conditions or various data, for example, a keyboard, mouse, etc.

The numerical control device 12 reads an NC program 13 which is stored in a ROM, RAM, not shown storage device, etc., deciphers the axial movement commands, including information which determines the position of the processing point, in the NC program 13 at an NC program deciphering unit 14, and generates movement commands, including information of amounts of movement of the different axial directions, from the deciphered axial movement commands at a movement command generation unit 15. Furthermore, the generated movement commands are sorted by a sorting unit 16 to X-axial and Y-axial direction movement commands and Z-axial direction movement commands. These are sent through a synchronization interface 34 to a servo control device 17 which controls the drive in the X-axial and Y-axial directions for a not shown movable table which holds a workpiece and a servo control device 18 which controls the drive in the Z-axial direction for a processing nozzle.

The servo control devices 17 and 18 control corresponding servo power supplies 19 and 20 in accordance with the movement commands to drive the servo motors 21 and 22 and, as a result, make the movable table move in the X-axial direction or Y-axial direction and, further, make the processing nozzle move in the Z-axial direction. The actual amounts of movement of the movable table and the processing nozzle are detected by corresponding pulse coders 23 and 24. These amounts of movement are fed back to the servo control devices 17 and 18. The servo control devices 17 and 18 compare and process the values of movement commands, which are generated from the deciphered axial movement commands and are sent to the servo power supplies 19 and 20, and the actual amounts of movement, which are detected by the pulse coders 23 and 24, at the feedback circuit and send movement commands of the differences to the servo power supplies 19 and 20 in accordance with the errors for performing feedback control.

Further, a gap sensor 25 which detects a gap between a workpiece 30 which is held at the movable table and the processing nozzle by a contact piece is attached to the processing nozzle. The path of transmission of the feedback signal can be switched with the pulse coder 24. Note that, instead of the gap sensor 25 using a contact, it is also possible to use an electrostatic capacity type gap sensor.

Further, the numerical control device 12 deciphers a laser output command including the laser output and pulse frequency, the duty ratio, and other information of the laser beam in the NC program 13 at the NC program deciphering unit 14, generates a laser output information command at the laser output information command generation unit 26, and sends this through the synchronization interface 34 to the laser control device 27. In the laser control device 27, in accordance with the laser output information command, a current command value which the laser power supply 28 should output is calculated and is commanded to the laser power supply 28. The laser power supply 28 feeds the excitation current of the commanded current command value to the laser generator 29. As a result, the laser generator 29 generates a laser beam. The generated laser beam is focused by a not shown focusing lens and is fired at the workpiece 30 to perform laser processing.

However, as explained above, the amount of movement obtained by a pulse coder can be collected in substantially real time, but for the laser output, the current command value which is commanded by the laser power supply 28 and the average laser output of the actually generated laser beam are not proportional. Further, the laser processing machine 10 shown in FIG. 2 is provided with a power monitor 31 for monitoring the laser output for comparison with a later explained estimated value of the laser output. However, such a power monitor 31 measures the heat flux due to the laser, so the time constant is around 1 second, that is, the response is slow. For this reason, real time collection of the average laser output is difficult.

Explaining this using an example, the time constant of the power monitor 31 is around 1 second, while the feed rate of the laser processing, in the case of high speed processing, sometimes reaches 30 m/min. Even in general processing, the feed rate is about 9 m/min. Consider the case of changing the laser output or other processing conditions at a certain point on the path when performing laser processing by a feed rate of 9 m/min. The laser output itself is electricity converted to light, so the output is switched within 1 ms in accordance with a change of the processing conditions. At this time, the speed of the processing point scanning over the workpiece 30 is 150 mm/s, so after 1 second after changing the processing conditions when the value of the power monitor 31 indicates the actual value, the processing point moves as much as 150 mm. By collecting and displaying the position information of the processing nozzle and the value of the power monitor 31 with this, it would be difficult for the operator to obtain a grasp of the processing state actually occurring at the processing point. There are also close to real time, high speed, accurate high speed power measuring devices, but these are expensive and the measuring devices themselves are large in size.

Furthermore, usually, an operator prepares an NC program for a pulse-like laser output with a designated peak output, pulse frequency, and duty ratio while considering the average laser output. Further, the excitation current which is commanded from the laser power supply 28 to the laser generator 29 is a pulse waveform. It is difficult to calculate the pulse frequency and the duty ratio in reverse from analog data.

Therefore, in feed rate estimation calculation units 32 and 33, the average laser output, that is, the average of the laser output which is actually fed from the processing nozzle to the workpiece, is estimated and is collected through the synchronization interface 34 at a processing information collection unit 35. Simultaneously with this, that is, feedback controlled position information at the time of firing the laser is collected through the synchronization interface 34 at the processing information collection unit 35. Finally, the processing information which was collected by the processing information collection unit 35 is displayed by a processing information display unit 36.

Figure 3:
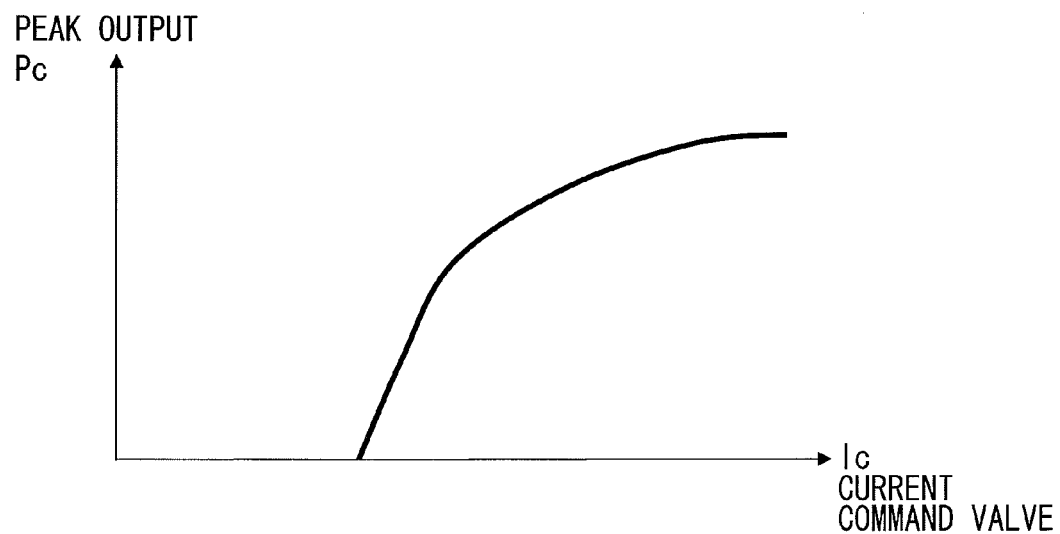
FIG. 3 is a view showing the relationship between a current command value and a peak output according to one aspect of the present invention.
Figure 4:
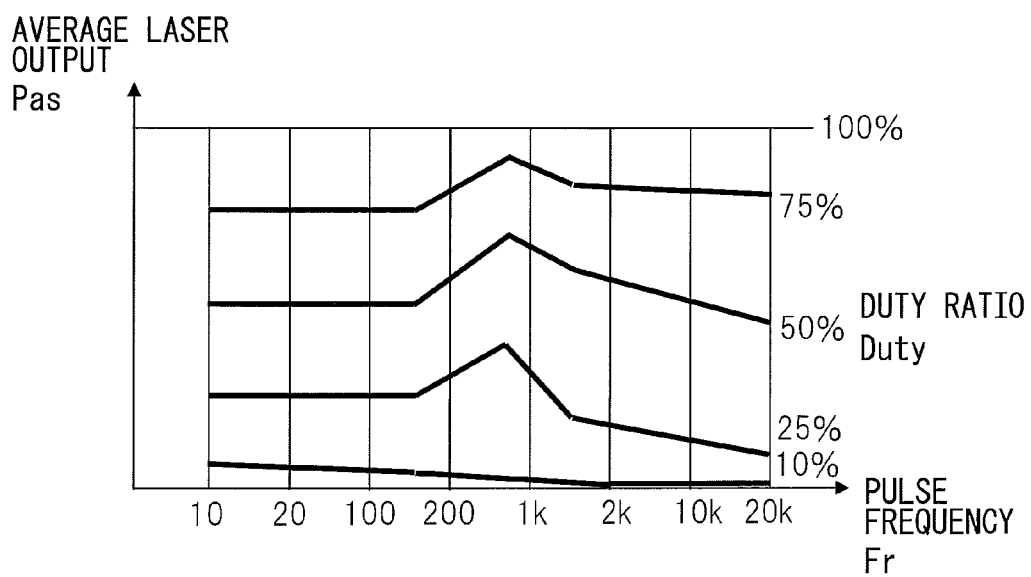
FIG. 4 is a view showing the relationship among a pulse frequency, a duty ratio, and an average laser output according to one aspect of the present invention.

Next, the estimation processing of the average laser output according to one aspect of the present invention performed in the feed rate estimation calculation units 32 and 33 will be explained. FIG. 3 is a view showing the relationship between a current command value Ic from the laser power supply 28 to the laser generator 29 and the peak output Pc according to one aspect of the present invention. The abscissa indicates the current command value Ic, while the ordinate indicates the peak output Pc. Further, FIG. 4 is a view showing the relationship among a pulse frequency Fr, duty ratio Duty, and average laser output Pas according to one aspect of the present invention. The abscissa indicates the pulse frequency Fr, while the ordinate indicates the average laser output Pas. That is, the average laser output does not necessarily match the product of the peak output Pc and the duty ratio Duty due to characteristics of the laser generator 29 etc. The average laser output Pas is calculated by interpolation between the pulse frequency Fr and the duty ratio Duty from the relationship shown in FIG. 4. The average laser output Pas at the time of the duty ratio Duty=100% matches the peak output Pc. These relationships shown in FIGS. 3 and 4 are found in advance by experiments or by calculations using the above-mentioned feed rate measurement unit 9, for example, high speed power measuring device 37 (see FIG. 2), and are stored in a ROM etc.

Figure 5:
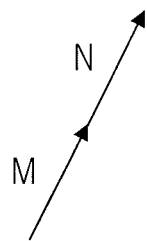
FIG. 5 is a view showing a path of laser processing according to one aspect of the present invention using a specific example.

FIG. 5 is a view showing a path of laser processing according to one aspect of the present invention using a specific example, while FIG. 6 is a view showing processing performed at the time of laser processing along the path shown in FIG. 5 using specific numerical values. The path shown in FIG. 5 is a straight line comprised of the sections M and N. The processing nozzle moves by the same speed and vector from the section M to the section N. At the sections M and N, the processing conditions of the laser output differ.

Referring to FIG. 6, the flow of command values becomes as follows: The numerical control device 12 deciphers the NC program 13 and, every fixed period, in FIG. 6, every 16 ms, generates a laser output information command and axial movement commands (A). The laser output information command is comprised of a set of a peak output Pc=500 W, pulse frequency Fr=1000 Hz, and duty ratio Duty=100% (section M) and a set of a peak output Pc=1000 W, pulse frequency Fr=2000 Hz, and duty ratio Duty=75% (section N). Further, the axial movement commands are the same in speed of movement, so are comprised of X-axial direction=1.073 and Y-axial direction=2.147, that is, fixed values. Further, Tc shows the timing of switching of the processing conditions. At the fifth command from the top, after 10/16/16 ms, that is, after 10 ms, the processing conditions are switched. Note that, for simplification of the explanation, the value of the Z-axial direction axial movement command is made 0.

Furthermore, the laser output information command is sent through the synchronization interface 34 to the laser control device 27, while the axial movement commands are sent through the sorting unit 16 and synchronization interface 34 to the servo control devices 17 (B). At this time, the laser output information command, which is comprised of the peak output Pc, pulse frequency Fr, and duty ratio Duty, is converted to the current command value Ic of the discharge current to the laser power supply 28, pulse-on time Ton, and pulse-off time Toff and then transmitted. The conversion from the peak output Pc=1000 W to the current command value Ic=7V is performed based on the relationship shown in FIG. 3. Further, the pulse-on time Ton and the pulse-off time Toff are found by finding the period from the pulse frequency Fr and considering with duty ratio with this. That is, if focusing on the fifth command from the top, since the pulse frequency Fr is 2000 Hz, the period becomes 0.5 ms. As opposed to this, if considering the fact that the duty ratio Duty is 75%, the pulse-on time Ton=0.375 ms and pulse-off time Toff=0.125 ms. Here, since this is digital calculation, the third decimal place on down are discarded and the result becomes the pulse-on time Ton=0.37 ms and pulse-off time Toff=0.12 ms.

Note that, the axial movement commands remain the X-axial direction=1.073 and Y-axial direction=2.147.

The 16 ms interval laser output information command and axial movement commands are converted at the laser control device 27 and servo control devices 17 to even shorter period, in FIG. 6, 1 ms interval laser output information command and axial movement commands (C). Further, these laser output information command and axial movement commands are sent to the laser power supply 28 and laser generator 29 and to the servo power supply 19 and servo motor 21 whereby a laser beam is fired and the movable table is moved. At the laser power supply 28, the commanded current command value Ic is run by a built-in counter circuit for example for the pulse-on time Ton and the feed of current is stopped for exactly the pulse-off time Toff. By repeating this, a pulse output is realized.

Note that, the axial movement commands, if converted to 1 ms intervals, become X-axial direction=0.067 and Y-axial direction=0.134.

After this, regarding the amount of axial movement, a feedback signal from a pulse coder 23 which is mechanically coupled and rotates with the servo motor 21 is collected as the actual amount of axial movement by the processing information collection unit 35 (D). The amount of axial movement of this collected feedback signal is the same as that used for feedback control in the servo control device. Further, as reference information, the power monitor value Pa=500 W monitored by the power monitor 31 is similarly collected by the processing information collection unit 35. However, as explained above, this power monitor value Pa does not accurately express the laser output. Note that, before these values are collected by the processing information collection unit 35, the later explained delay processing is performed.

On the other hand, regarding laser output, the processing information collection unit 35 collects results of estimation calculation from the laser output information command transmitted from the laser control device 27 to the laser power supply 28. That is, in the feed rate estimation calculation units 32 and 33, conversion processing reverse to the above-mentioned processing is performed.

First, the estimated peak output Pcs=1000V is calculated from the current command value Ic=7V of the discharge current to the laser power supply based on FIG. 3. This estimated value just happens to match the original peak output Pc=1000 W, that is, the immediately succeeding value deciphered from the NC program 13, but these conversions or calculations are performed by digital calculations, so error sometimes occurs. If converting from the pulse-on time Ton and pulse-off time Toff to the pulse frequency Fr and duty ratio Duty, estimated pulse frequency Frs=2041 Hz and estimated duty ratio Dutys=75.5%. In the original laser output information command, pulse frequency Fr=2000 Hz and duty ratio Duty=75%, so error occurs. This error results since originally the pulse-on time Ton=0.375 ms and pulse-off time Toff=0.125 ms, but these are made the pulse-on time Ton=0.37 ms and pulse-off time Toff=0.12 ms. Note that, the estimation up to here is performed by the feed rate estimation calculation unit 32 (E).

The feedback signal from the pulse coder and the estimated calculated value of the laser output command are collected at this stage through the synchronization interface, so can be recorded for a certain period in which the mutual timing between the position information of the processing nozzle and the laser output is guaranteed.

Next, the estimated peak output Pc, pulse frequency Fr, and duty ratio Duty are used to calculate by estimation the average laser output value Pas. This estimation calculation is performed by interpolation calculation from the relationship shown in FIG. 4. That is, when the duty ratio Duty=100%, the average laser output becomes the same as the peak output Pc=1000 W. Therefore, if using the previously found estimated pulse frequency Frs=2041 Hz and estimated duty ratio Dutys=75.5% as the basis for interpolation calculation from the relationship shown in FIG. 4, the average laser output Pas=805 W is calculated (F). The estimation up to here is performed by the feed rate estimation calculation unit 33.

Finally, compared with when finding the actual amount of axial movement, it takes time for the estimation processing of the average laser output to be performed, so to correct the time differences, delay processing is performed for the data. The amount of correction is found in advance by experiments etc.

As explained above, according to one aspect of the present invention, by collecting the feedback signals from the pulse coders 23 and 24 and estimated values based on the values of the laser output information command through the synchronization interface 34 by the processing information collection unit 35, it becomes possible to correct the axial movement amounts and timing of the average laser output and display the results on a processing information display unit 36 or output them to a hard disk drive or other storage device. Due to this, it is possible to display on a display device by what extent an actual path deviates from the intended path of the processing point, possible to display deviation between the intended laser output and the actual laser output, and possible to output it to the storage device.

FIG. 7 is a view showing an example of display of processing information obtained by processing along the path shown in FIG. 5. The abscissa shows the time t. The average laser output Pas estimated for a position X of the processing nozzle is shown. Further, by way of reference, the power monitor value Pa and the measurement value Pr which is measured by a high speed power measuring device are also displayed. As a result, the power monitor value Pa, despite being actually measured data, does not express the switching of the laser output well, while the average laser output Pas which is estimated by one aspect of the present invention shows the same tendency as the measurement value Pr which is measured by the high speed power measuring device and reproduces the switching of the actual laser output well, it is learned.

Figure 8:
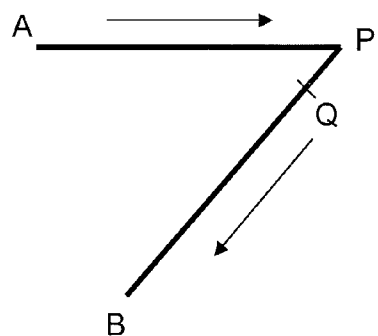
FIG. 8 is a view showing a path of laser processing according to one aspect of the present invention using another specific example.

FIG. 8 is a view showing a path of laser processing according to one aspect of the present invention using another specific example. The path shown by FIG. 8 is accompanied with an acute angle corner part. Laser processing is heat processing, so at such an acute angle part, overheating occurs more easily and processing defects occur more easily than with a straight path. Therefore, in the part of the section PQ rising from the vertex P of the acute angle corner, the processing conditions are changed. From the point Q, where it is considered the straight part has generally been returned to, the original processing conditions are returned to, whereby processing defects are prevented. In the section PQ, the processing speed is also kept low and the average laser output is kept down as much as possible to prevent heat input. On the other hand, a laser output passing through the workpiece is necessary, so the technique is adopted of setting the peak output high and reducing the duty ratio by that amount so as to reduce the average laser output.

The speed at the vertex P and section PQ is slower compared with other sections, so around the section PQ, there is a deceleration or acceleration section. In this acceleration/deceleration section, the laser output conditions are gradually changed in accordance with the speed so as to prevent the amount of input heat per unit length from becoming excessive.

Figure 9:
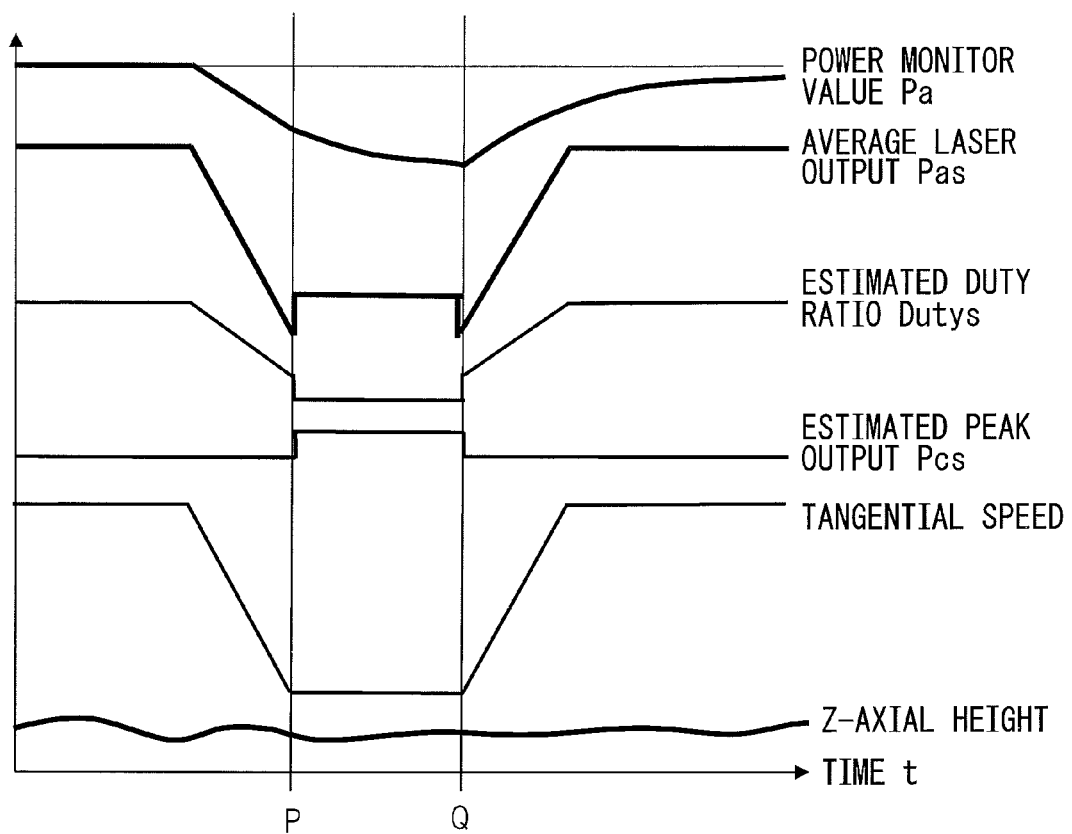
FIG. 9 is a view showing an example of display of processing information obtained by processing along the path shown in FIG. 8.

The above estimation was performed considering the above. The results are displayed in the same way as in FIG. 7 for comparison of the various values. FIG. 9 is a view showing an example of display of processing information obtained by processing along the path shown in FIG. 8. The abscissa indicates the time t.

First, if taking note of the tangential speed, if approaching the vertex P, deceleration is started. At the corner rising section PQ, movement is performed at a low speed. After this, after passing the point Q, acceleration is started and the usual tangential speed is returned to.

As opposed to this, the estimated peak output Pcs which is calculated in reverse from the current command value Ic of the discharge current to the laser power supply based on the relationship shown in FIG. 3 is a somewhat higher value at only the section PQ compared with the other sections so as to maintain the force penetrating through the plate. On the other hand, the estimated duty ratio Dutys calculated in reverse from the pulse-on time and off time becomes smaller along with deceleration and, at the section PQ, is reduced to its minimum limit. Further, it increases along with acceleration and changes the output of the laser. Further, the changes in the average laser output Pas which is calculated based on the estimated peak output Pcs, estimated pulse frequency Frs, estimated duty ratio Dutys, and relationship shown in FIG. 4 are also shown in FIG. 9. On the other hand, it is shown that the power monitor value Pa by the power monitor 31 is delayed from the behavior of the actual laser output.

As clear from a comparison of the average laser output Pas and the power monitor value Pa, according to the estimation processing of one aspect of the present invention, it becomes possible to calculate a value accurately reproducing the switching of the processing conditions and becomes possible to reproduce processing information at a processing point which is difficult to observe.

In this regard, in the laser processing machine 10, to maintain a constant height of a focusing point on the workpiece 30, the distance between the workpiece 30 and the processing nozzle is measured during the processing and feedback control in the Z-axial direction is performed by the servo control device 18 in accordance with this height. This is because the workpieces 30 which are processed by laser are mostly plate shaped. The surfaces scanned by the focused point are not completely flat. Just a slight change in the distance between the focused point and workpiece 30 has a serious effect on the processing results. For this reason, in the example of display shown in FIG. 9, the Z-axial height is also displayed. According to one aspect of the present invention, it becomes possible to accurately estimate the average laser output in real time, so by simultaneously displaying this and the Z-axial height in real time, it becomes possible to learn the effects of change in the Z-axial height on the laser processing in real time.

Figure 10:
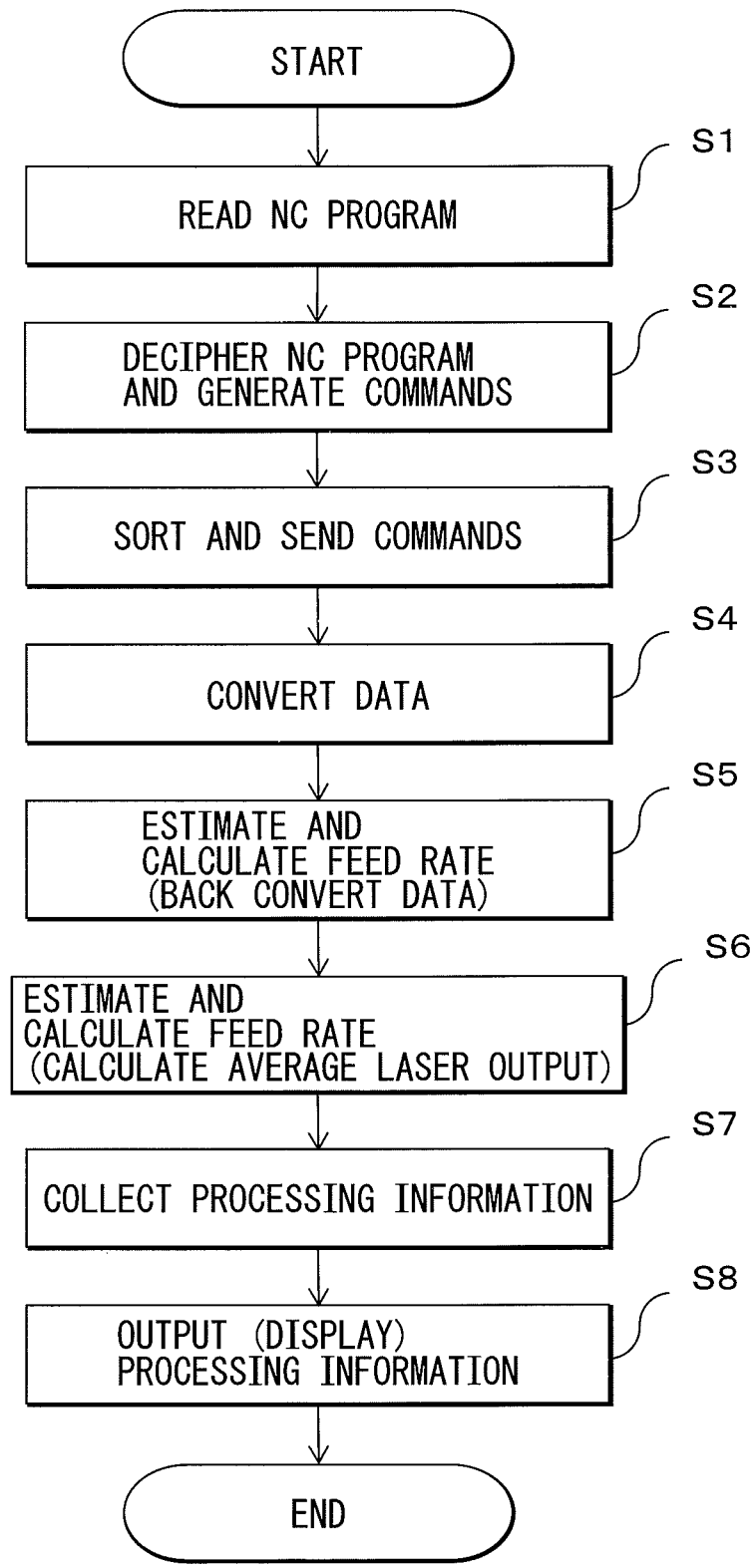
FIG. 10 is a view showing a flowchart of feed rate estimation processing according to one aspect of the present invention.

FIG. 10 is a view showing a flowchart of feed rate estimation processing according to one aspect of the present invention explained using the above laser processing machine 10 as an example. First, at step S1, the NC program is read. Next, at step S2, the NC program which was read at step S1 is deciphered and the deciphered NC program is used as the basis to generate a laser output information command and axial movement commands. Next, at step S3, the output information command and axial movement commands generated at step S2 are sorted and sent. Next, at step S4, the data is converted, that is, is converted to shorter period commands. Next, at step S5, based on the relationship shown in FIG. 3, reverse conversion processing of the data for calculating the estimated peak output Pcs etc. from the current command value Ic, that is, feed rate estimation calculation, is performed. Next, at step S6, feed rate estimation calculations are performed for calculating the average laser output Pas based on the relationship shown in FIG. 4. Next, at step S7, the timing of the position information and the average laser output is corrected and the processing information is collected, while at step S8, the processing information is output, for example, is displayed on a display device.

Figure 11:
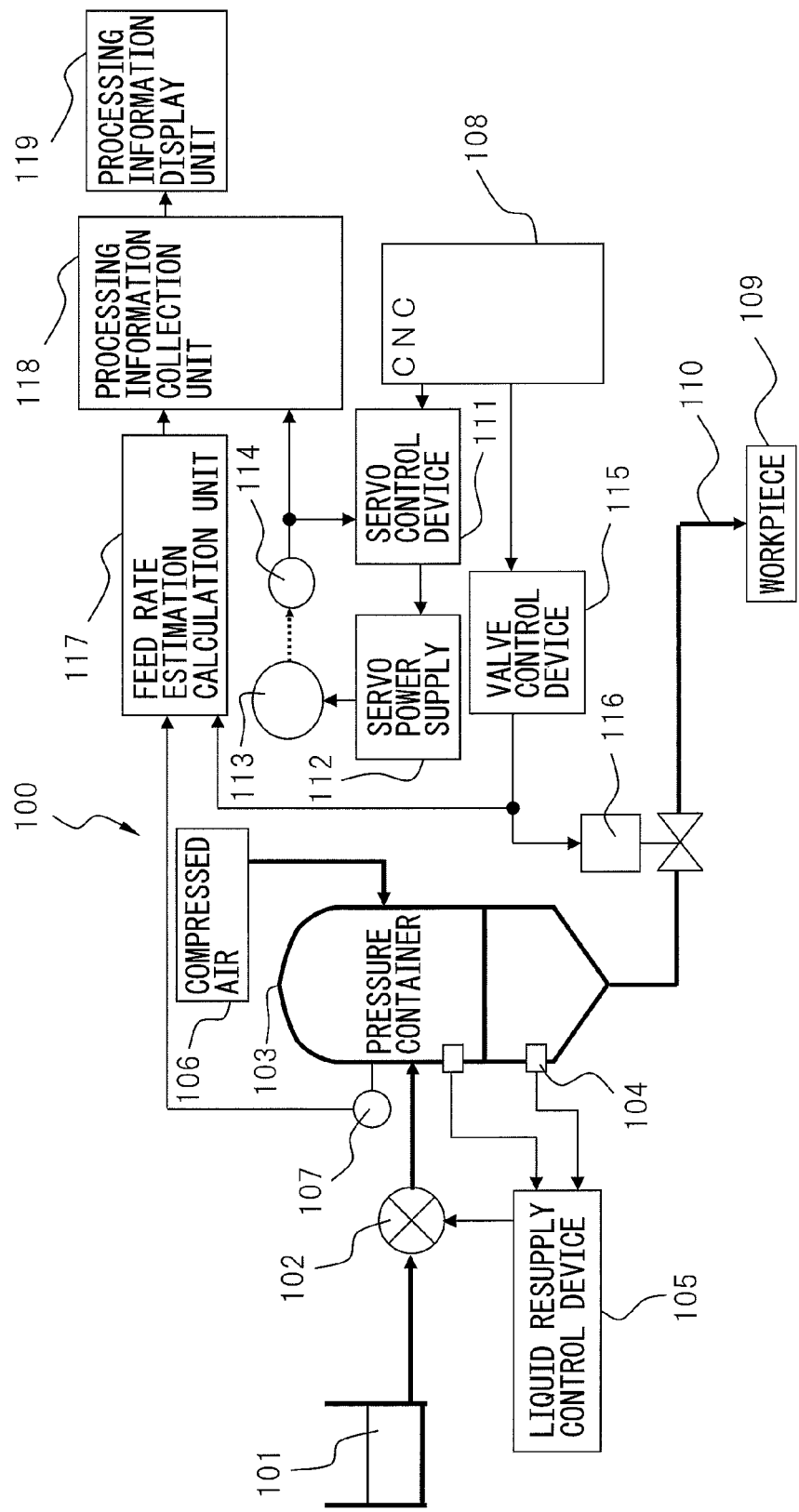
FIG. 11 is a view showing the specific configuration of a processing information acquisition system according to another aspect of the invention.

FIG. 11 is a view showing the specific configuration of a processing information acquisition system according to another aspect of the invention using an adhesive coater 100 which coats an adhesive at a peripheral edge of a workpiece as an example.

An adhesive is stored in a liquid storage tank 101 and is introduced by a gear pump 102 into a pressure container 103. The pressure container 103 has a liquid level gauge 104 arranged in it. A liquid resupply control device 105 which monitors the value of the liquid level gauge 104 controls the gear pump 102 so as to operate the gear pump 102 to resupply adhesive in the pressure container 103 if the liquid level falls and to stop the gear pump 102 when the liquid level reaches a predetermined height. Compressed air 106 is introduced to the pressure container 103 from the outside and 0.5 to 0.8 MPa of pressure is applied. The pressure inside of the pressure container 103 is measured by the pressure gauge 107.

The numerical control device (CNC) 108 controls the relative positions of the workpiece 109 and the processing nozzle 110 by sending movement commands to the servo control device 111 which controls the drive of a not shown movable table which holds the workpiece 109. The servo control device 111 controls the servo power supply 112 in accordance with the movement commands to drive the servo motor 113 and finally make the movable table move. The amount of actual movement of the movable table is detected by the pulse coder 114 then the movement amount is fed back to the servo control device 111. The servo control devices 111 compares the values of the movement commands and the amount of actual movement detected by the pulse coder 114 by the feedback circuit in the servo control device 111 and sends movement commands of the difference to the servo power supply 112 in accordance with the error for performing feedback control.

Further, the numerical control device 108 sends a valve opening/closing command to a valve control device 115. The valve control device 115 controls the opening and closing of a proportional valve 116 in accordance with a valve opening/closing command and controls the feed rate of the adhesive to the workpiece 109. The proportional valve 116 is a valve with an opening degree which changes in accordance with a command voltage included in the valve opening/closing command. Therefore, the proportional valve 116 is a valve in which the opening degree is proportionally controlled and is not a valve in which the valve opening area or the flow rate of the adhesive is proportionally controlled. Further, the flow rate of the adhesive changes by the pressure of the compressed air 106 as well. Further, the adhesive is first coated on the workpiece 109 after reaching the processing nozzle 110 arranged at the end of the piping. Therefore, furthermore, an adhesive is high in viscosity, so there is a response delay from when the proportional valve 116 opens to when the adhesive reaches the workpiece 109. There is also a response delay from when the proportional valve 116 becomes fully closed to when the feed of the adhesive ends.

Here, when the processing nozzle 110 moves with respect to the workpiece 109 by a constant speed, it is preferable that the adhesive flow rate be constant. However, at the time of acceleration when starting the coating work, at the time of acceleration and deceleration near the corner part when coating a corner part along a path such as shown in FIG. 8, or the time of deceleration when ending the coating work, if not adjusting the flow rate in accordance with the speed, it is not possible to coat a fixed amount of adhesive per unit length. In particular, when changing the flow rate, it is necessary to also consider the response delay from when changing the valve opening degree of the proportional valve 116 to when the flow rate actually changes.

The operator endeavors to coat an adhesive well with no coating defects by changing the operating conditions of the proportional valve 116 in various ways and deciding on the conditions to set while viewing the state of coating on the workpiece 109, but if it were possible to learn the amount of the adhesive coated on the workpiece 109 during the processing, a striking improvement in the work efficiency could be expected.

Therefore, in the embodiment shown in FIG. 11, a valve opening/closing command to the proportional valve 116 and the pressure value inside the pressure container 103 which is shown by the pressure gauge 107 are used as the basis to calculate by estimation the actual feed rate of adhesive from the processing nozzle 110. By synchronizing, collecting, and outputting the estimated adhesive feed rate and amount of axial movement, that is, position information, the operator can easily understand the relationship between the speed of the processing nozzle 110 and adhesive feed rate.

Specifically, first, the cross-sectional area of the valve opening is calculated by estimation from the command voltage to the proportional valve 116. The relationship between the command voltage and the cross-sectional area is found in advance by experiments etc. By utilizing the relationship between the command voltage and the cross-sectional area and considering the pressure inside the pressure container 103, it is possible to calculate the estimated flow rate at the proportional valve 116. The flow rate at the processing nozzle 110 has some response delay, so the flow rate when assumed as a primary delay system with respect to changes in the flow rate at the proportional valve 116 is calculated by estimation as the flow rate at the processing nozzle 110. The results are displayed together with the position information and speed information from the pulse coder 114. As a result, it becomes possible to accurately estimate the adhesive flow rate and becomes possible to easily set the processing conditions.

As explained above, in a first aspect of the present invention, there is provided a processing information acquisition system in a processing machine which supplies a processing point with energy or material, which system is provided with a position information acquisition unit which acquires position information of a feed unit of energy or material, a feed rate control unit which receives a feed condition command of energy or material, converts the feed condition command to a control command which controls a feed of energy or material, and uses the converted control command to control a feed rate of energy or material from the feed unit, a feed rate estimation unit which acquires the control command from the feed rate control unit and calculates an estimated feed rate of energy or material which is fed to a processing point based on the control command, and an output unit which outputs the position information which the position information acquisition unit acquired and the estimated feed rate which the feed rate estimation unit calculated when the feed unit is located at a position corresponding to the position information.

That is, in the first aspect of the present invention, the effect is exhibited that a processing machine which feeds a processing point energy or material can estimate and output processing information relating to the actual processing state at a processing point, including position information of the processing point. Further, the first aspect of the present invention can be utilized in various situations such as the monitoring of the processing state, development stage, and troubleshooting.

Further, in a second aspect of the present invention, there is provided a processing information acquisition system where the fed energy or material is one or more types of energy or material selected from a light wave, current, plasma stream, gas, liquid, solid, powder, and atomized fluid.

That is, the second aspect of the present invention enables application to various types of processing machines.

Further, in a third aspect of the present invention, there is provided a processing information acquisition system where the feed rate estimation unit has related information, found in advance, between the control command and the estimated feed rate of energy or material and calculates the estimated feed rate from the control command and the related information.

Further, in a fourth aspect of the present invention, there is provided a processing information acquisition system which is further provided with a feed rate measurement unit which finds the related information in advance.

Further, in a fifth aspect of the present invention, there is provided a processing information acquisition system where the related information is a calculation formula or parameter or map.

That is, the third to fifth aspects of the present invention enable calculation of the accurate estimated feed rate by having related information, found in advance, between the control command and the estimated feed rate of energy or material.

Further, in a sixth aspect of the present invention, there is provided a processing information acquisition system where the processing machine is a laser processing machine and where the fed energy or material is a laser beam or assist gas.

Further, in a seventh aspect of the present invention, there is provided a processing information acquisition system where the processing machine is a laser processing machine, the fed energy or material is a laser beam or assist gas, the related information is comprised of first related information prescribed in a peak output and a current command value and a second related information prescribed by a peak output, a pulse frequency, and a duty ratio, and the feed rate estimation unit uses a current command value and the first related information to estimate a peak output and uses an estimated peak output, pulse frequency, duty ratio, and the second related information to estimate an average laser output.

Further, in an eighth aspect of the present invention, there is provided a processing information acquisition system wherein the processing machine is a plasma processing machine and where the fed energy or material is an arc current, plasma generating current, gas, or welding filler.

Further, in a ninth aspect of the present invention, there is provided a processing information acquisition system where the processing machine is a solvent coating processing machine and where the fed energy or material is a paint, adhesive, or sealant.

Further, in a 10th aspect of the present invention, there is provided a processing information acquisition system where the output unit outputs the position information, which the position information acquisition unit acquired, and the estimated feed rate, which the feed rate estimation unit calculated when the feed unit is at a position corresponding to the position information, to a display unit or storage unit.

That is, in the 10th aspect of the present invention of the present invention, the effect is exhibited that an operator can obtain a visual grasp of the processing state through the display unit or monitoring by a monitoring system becomes easy by output to a storage unit.

In all of the aspects of the present invention, the common advantageous effect is exhibited that a processing machine which feeds a processing point energy or material can estimate and output processing information relating to the actual processing state at a processing point, including position information of the processing point.

Above, the present invention was explained with reference to preferred embodiments, but a person skilled in the art would understand that various corrections and changes could be made without departing from the scope of the following claims.

The invention claimed is:

1. A processing information acquisition system in a processing machine which supplies a processing point with energy or material, the processing information acquisition system comprising:
   a processor;
   a position information acquisition unit which acquires position information of a feed unit of energy or material,
   a feed rate control unit which receives a feed condition command of energy or material, converts said feed condition command to a control command which controls a feed of energy or material, and uses the converted control command to control a feed rate of energy or material from said feed unit,
   a feed rate estimation unit which acquires said control command from said feed rate control unit and calculates an estimated feed rate of energy or material which is fed to a processing point based on said control command, and
   an output unit which outputs said position information which said position information acquisition unit acquired and said estimated feed rate which said feed rate estimation unit calculated when said feed unit is located at a position corresponding to said position information,
   where said feed rate estimation unit has related information, found in advance, between said control command and said estimated feed rate of energy or material and calculates the estimated feed rate from said control command and said related information, and
   where said processing machine is a laser processing machine, said fed energy or material is a laser beam, said related information is comprised of first related information prescribed in a peak output and a current command value and a second related information prescribed by a peak output, a pulse frequency, and a duty ratio, and said feed rate estimation unit uses a current command value and said first related information to estimate a peak output, uses pulse-on time and pulse-off time to estimate pulse frequency and duty ratio, and uses an estimated peak output, estimated pulse frequency, estimated duty ratio, and said second related information to estimate an average laser output.

2. A processing information acquisition system as set forth in claim 1, which is further provided with a feed rate measurement unit which finds said related information in advance.

3. A processing information acquisition system as set forth in claim 1, where said related information is a calculation formula or parameter or map.

4. A processing information acquisition system as set forth in claim 1, where said output unit outputs said position information, which said position information acquisition unit acquired, and said estimated feed rate, which said feed rate estimation unit calculated when said feed unit is at a position corresponding to said position information, to a display unit or storage unit.

* * * * *